US011946315B2

(12) United States Patent
Wang

(10) Patent No.: US 11,946,315 B2
(45) Date of Patent: Apr. 2, 2024

(54) SAFETY GATE

(71) Applicant: DEMBY DEVELOPMENT CO., LTD., New Taipei (TW)

(72) Inventor: Tsung-Hsiang Wang, New Taipei (TW)

(73) Assignee: Demby Development Co., Ltd., New Taipei (TW)

( * ) Notice: Subject to any disclaimer, the term of this patent is extended or adjusted under 35 U.S.C. 154(b) by 0 days.

(21) Appl. No.: 17/987,583

(22) Filed: Nov. 15, 2022

(65) Prior Publication Data

US 2023/0175317 A1 Jun. 8, 2023

(30) Foreign Application Priority Data

Dec. 3, 2021 (CN) ......................... 202123027147.4

(51) Int. Cl.
*E06B 9/04* (2006.01)
*E06B 9/00* (2006.01)

(52) U.S. Cl.
CPC .......... *E06B 9/00* (2013.01); *E06B 2009/002* (2013.01)

(58) Field of Classification Search
CPC ............................. E06B 9/00; E06B 2009/002
USPC ........................................................ 49/55, 57
See application file for complete search history.

(56) References Cited

U.S. PATENT DOCUMENTS

| | | | | |
|---|---|---|---|---|
| 2,899,717 A * | 8/1959 | Billings et al. | D06F 39/14 | 49/193 |
| 4,677,791 A * | 7/1987 | Larson | E06B 9/02 | 49/55 |
| 6,178,693 B1 * | 1/2001 | Hunt | A01K 1/0023 | 49/63 |
| 8,615,928 B2 * | 12/2013 | Wang | E04H 17/013 | 49/55 |
| 11,268,320 B1 * | 3/2022 | Flannery | E05B 65/0007 | |
| 11,371,264 B2 * | 6/2022 | Zhang | E05B 65/0007 | |
| 11,639,630 B1 * | 5/2023 | Flannery | A47D 13/065 | 160/130 |
| 11,655,671 B2 * | 5/2023 | He | E05B 65/0007 | 49/57 |
| 11,686,150 B1 * | 6/2023 | Flannery | E05B 65/0007 | 49/258 |
| 11,739,589 B1 * | 8/2023 | Kaiser | E06B 9/04 | 49/394 |
| 2002/0002795 A1 * | 1/2002 | Rogers | E06B 9/04 | 49/463 |

(Continued)

FOREIGN PATENT DOCUMENTS

| | | | | |
|---|---|---|---|---|
| DE | 202020105174 U1 * | 10/2020 | E05B 65/0014 |
| EP | 1524399 A1 * | 4/2005 | E06B 9/02 |
| WO | WO-9909285 A1 * | 2/1999 | E06B 9/02 |

*Primary Examiner* — Jerry E Redman
(74) *Attorney, Agent, or Firm* — Rosenberg, Klein & Lee

(57) ABSTRACT

A safety gate is configured to be mounted at a gateway and has a frame and a gate body. The frame is configured to be mounted between two walls disposed at two sides of the gateway. The frame has two sides and two first positioning assemblies respectively disposed at the two sides of the frame. The gate body is disposed in the frame and has two sides and two first pivot assemblies respectively disposed at the two sides of the gate body. The first pivot assembly at each side of the gate body is configured to detachably and pivotally connect with the first positioning assembly at a respective one of the sides of the frame.

17 Claims, 10 Drawing Sheets

(56) References Cited

U.S. PATENT DOCUMENTS

| | | | | |
|---|---|---|---|---|
| 2003/0009945 | A1* | 1/2003 | Cheng | E06B 9/04<br>49/55 |
| 2006/0207180 | A1* | 9/2006 | Cheng | E05B 65/0014<br>49/57 |
| 2007/0294944 | A1* | 12/2007 | Pedersen | E06B 9/04<br>49/50 |
| 2018/0148954 | A1* | 5/2018 | Raffi | E05B 59/00 |
| 2021/0062550 | A1* | 3/2021 | Zhang | E05B 65/0007 |
| 2021/0180393 | A1* | 6/2021 | Torosian | E06B 11/04 |
| 2023/0175317 | A1* | 6/2023 | Wang | E06B 9/04<br>49/50 |
| 2023/0203878 | A1* | 6/2023 | Wang | E06B 9/02<br>160/84.06 |

* cited by examiner

SAFETY GATE

BACKGROUND OF THE INVENTION

1. Field of the Invention

The present invention relates to protection products, especially to a safety gate.

2. Description of Related Art

For safety, a conventional safety gate is placed at an entrance of a kitchen, stairway, or bathroom to limit an accessible region for children or pets, thereby reducing accidents.

However, the conventional safety gate can be opened at only one side, so a user needs to open the conventional safety gate with different hands when entering and exiting the conventional safety gate. It is inconvenient to open the conventional safety gate.

To overcome the shortcomings, the present invention provides a safety gate to mitigate or obviate the aforementioned problems.

SUMMARY OF THE INVENTION

The main objective of the present invention is to provide a safety gate that can be opened at both sides thereof.

The safety gate configured to be mounted at a gateway comprises a frame and a gate body. The frame is configured to be mounted between two walls respectively disposed at two sides of the gateway and has two sides and two first positioning assemblies. Each of the two first positioning assemblies is disposed at a respective one of the two sides of the frame. The gate body is disposed in the frame and has two sides and two first pivot assemblies. Each of the two first pivot assemblies is disposed at the two sides of the gate body for being detachably and pivotally connected to the first positioning assembly disposed at one of the two sides of the frame. One of the two sides of the gate body is detachably connected to one of the two sides of the frame via a detachable connection of the first pivot assembly disposed at the side of the gate body and the positioning assembly disposed at the sides of the frame. The other one of the two sides of the gate body is detachably connected to the other one of the two sides of the frame via a detachable connection of the first pivot assembly disposed at the other side of the gate body and the first positioning assembly disposed at the other side of the frame. One of the two sides of the gate body is pivotally connected to one of the two sides of the frame when the other one of the two sides of the gate body is detached from the other one of the two sides of the frame.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
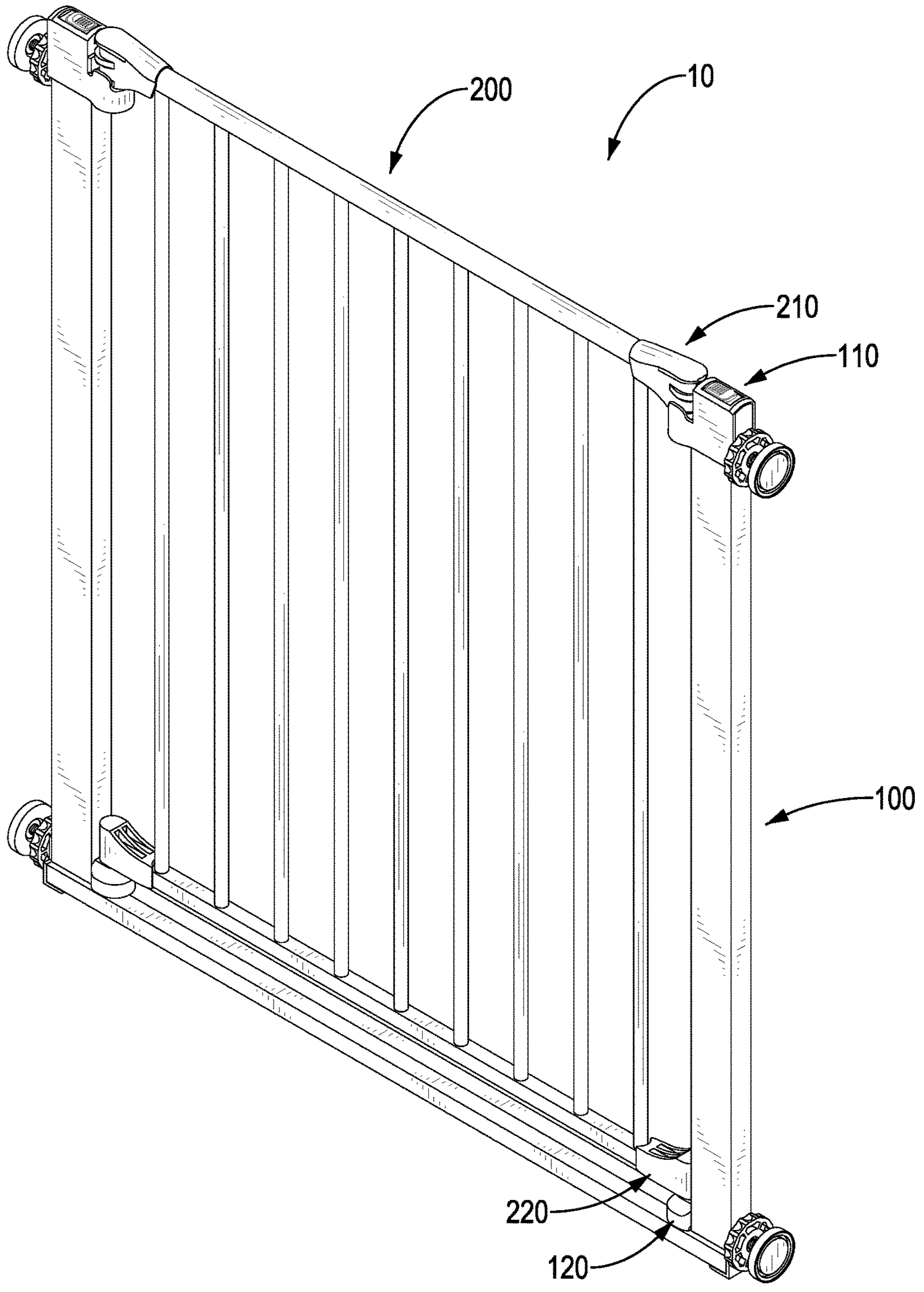
FIG. 1 is a perspective view of a first embodiment of a safety gate in accordance with the present invention.

With reference to FIGS. 1, and 3 to 6, a first embodiment of a safety gate 10 in accordance with the present invention is configured to be mounted at a gateway. The safety gate 10 has a frame 100 and a gate body 200. The frame 100 is configured to be mounted between two walls respectively disposed at two opposite sides of the gateway. The frame 100 has two sides and two first positioning assemblies 110. Each of the two first positioning assemblies 110 is disposed at a respective one of the two sides of the frame 100, and is located near a top of the frame 100. The gate body 200 is disposed in the frame 100 and has two sides and two first pivot assemblies 210. Each of the two first pivot assemblies 210 is disposed at a respective one of the two sides of the gate body 200, is located near a top of the gate body 200, and is configured to be detachably and pivotally connected to one of the two first positioning assemblies 110. One of the two sides of the gate body 200 is detachably connected to one of the two sides of the frame 100 via a detachable and pivotal connection between the first pivot assembly 210 disposed at the side of the gate body 200 and the first positioning assembly 110 disposed at the side of the frame 100. The other side of the gate body 200 is detachably connected to the other side of the frame 100 via a detachable connection between the first pivot assembly 210 disposed at the other side of the gate body 200 and the first positioning assembly 110 disposed at the other side of the frame 100. Either of the two sides of the gate body 200 can be disconnected from the two sides of the frame 100. When one of the two sides of the gate body 200 is disconnected from one of the two sides of the frame 100, the first pivot assembly 210 at the other side of the gate body 200 is capable of pivoting relative to the first positioning assembly 110 at the other side of the frame 100. For example, when the safety gate 10 is closed, the first pivot assembly 210 disposed at any one of the two sides of the gate body 200 can be detached from the first positioning assembly 110 disposed at the respective side of the frame 100 by a user. After that, the first pivot assembly 210 disposed at the other side of the gate body 200 is still pivotally connected with the first positioning assembly 110 disposed at the other side of the frame 100. So the gate body 200 is capable of pivoting with respect to the first positioning assembly 110 disposed at the other side of the frame 100 to open the safety gate 10. In other words, the safety gate 10 can be opened from any one of the two sides of the gate body 200 according to the user's need. Accordingly, the user can choose a convenient side to open the safety gate 10, thereby enhancing the operation convenience to open the safety gate 10.

As long as the gateway has two opposite walls for assembling the frame 100, the above-mentioned gateway can be an entrance to a stairway, bedroom, kitchen, balcony, and so on. The walls located at the two sides of the gateway may be brick walls, wooden walls, or glass walls, but are not limited thereto.

With reference to FIGS. 5 to 8, the first positioning assembly 110 has a first positioning base 111 and a first engaging hole 112 formed in a peripheral surface of the first positioning base 111 opposite to a bottom thereof. The first pivot assembly 210 has a first mounting base 211 mounted to the gate body 200 and a first retractable pin 212 retractably connected with the first mounting base 211. The first retractable pin 212 has an end capable of extending out from a bottom of the first mounting base 211. The end of the first retractable pin 212 is capable of extending into the first engaging hole 112 formed in the first positioning base 111. When the first retractable pin 212 of the first pivot assembly 210 disposed at one side of the gate body 200 extends into the first engaging hole 112 of the first positioning assembly 110 disposed at one side of the frame 100, the first side of the gate body 200 is pivotally connected to the side of the frame 100. And the first retractable pin 212 of the first pivot assembly 210 disposed at the other side of the gate body 200 is capable of retracting from the first engaging hole 112 of the first positioning assembly 110 disposed at the other side of the frame 100 for separating the other side of the gate body 200 and the other side of the frame 100. To close the safety gate 10, the first retractable pins 212 of the first pivot assemblies 210 respectively disposed at the two sides of the gate body 200 are respectively inserted into the first engaging holes 112 of the first positioning assemblies 110 respectively disposed at the two sides of the frame 100 to fix the gate body 200 to the frame 100. To open the safety gate 10, for example, any one of the two sides of the gate body 200 is lifted up, the first retractable pin 212 of the first pivot assembly 210 disposed at the side of the gate body 200 is removed from the first engaging hole 112 of the first positioning assembly 110 disposed at the respective side of the frame 100. Consequently, the gate body 200 is capable of pivoting according to the other side of the frame 100 for opening the safety gate 10.

With reference to FIGS. 5 to 8, in some embodiments, the first pivot assembly 210 has a limiting groove 213 formed in the first mounting base 211 at a side of the first mounting base 211 away from the other side of the gate body 200. The first positioning assembly 110 has a limiting member 113, slidably mounted within the first positioning base 111 of the first positioning assembly 110, for selectively engaging with the limiting groove 213 of the first pivot assembly 210 at the side of the gate body 200. The limiting member 113 of the first positioning assembly 110 has an end aligned with the limiting groove 213 of the first pivot assembly 210.

For example, when one side of the gate body 200 is connected to one side of the frame 100, the limiting member 113 of the first positioning assembly 110 disposed at the side of the frame 100 can be pushed to engage with the limiting groove 213 of the first pivot assembly 210 disposed at the side of the gate body 200 to fix the side of the gate body 200 and the side of the frame 100 and prevent the side of the gate body 200 from being separated from the frame 100.

Therefore, when the limiting member 113 of the first positioning assembly 110 disposed at one side of the frame 100 is moved out from the limiting groove 213 of the first pivot assembly 210 disposed at the respective side of the gate body 200, the respective side of the gate body 200 can be lifted to remove the first retractable pin 212 of the first pivot assembly 210 from the first engaging hole 112 of the first positioning assembly 110. The other side of the gate body 200 is still pivotally connected to the other side of the frame 100 and is unable to be detached from the frame 100 because of the engagement of the limiting member 113 and the limiting groove 213.

Figure 7:
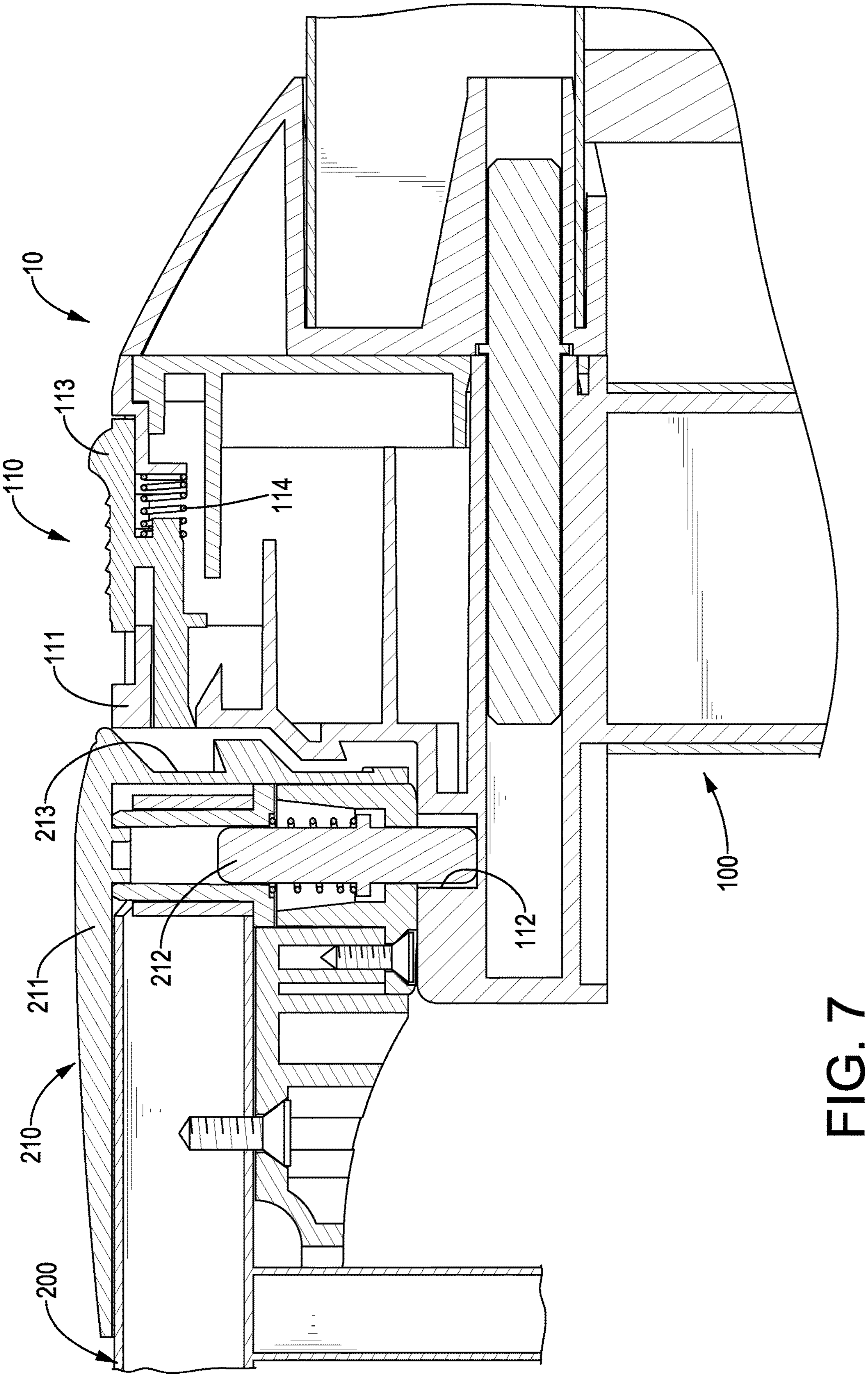
FIG. 7 is an enlarged front side view in partial section of the second embodiment of the safety gate in FIG. 2.
Figure 8:
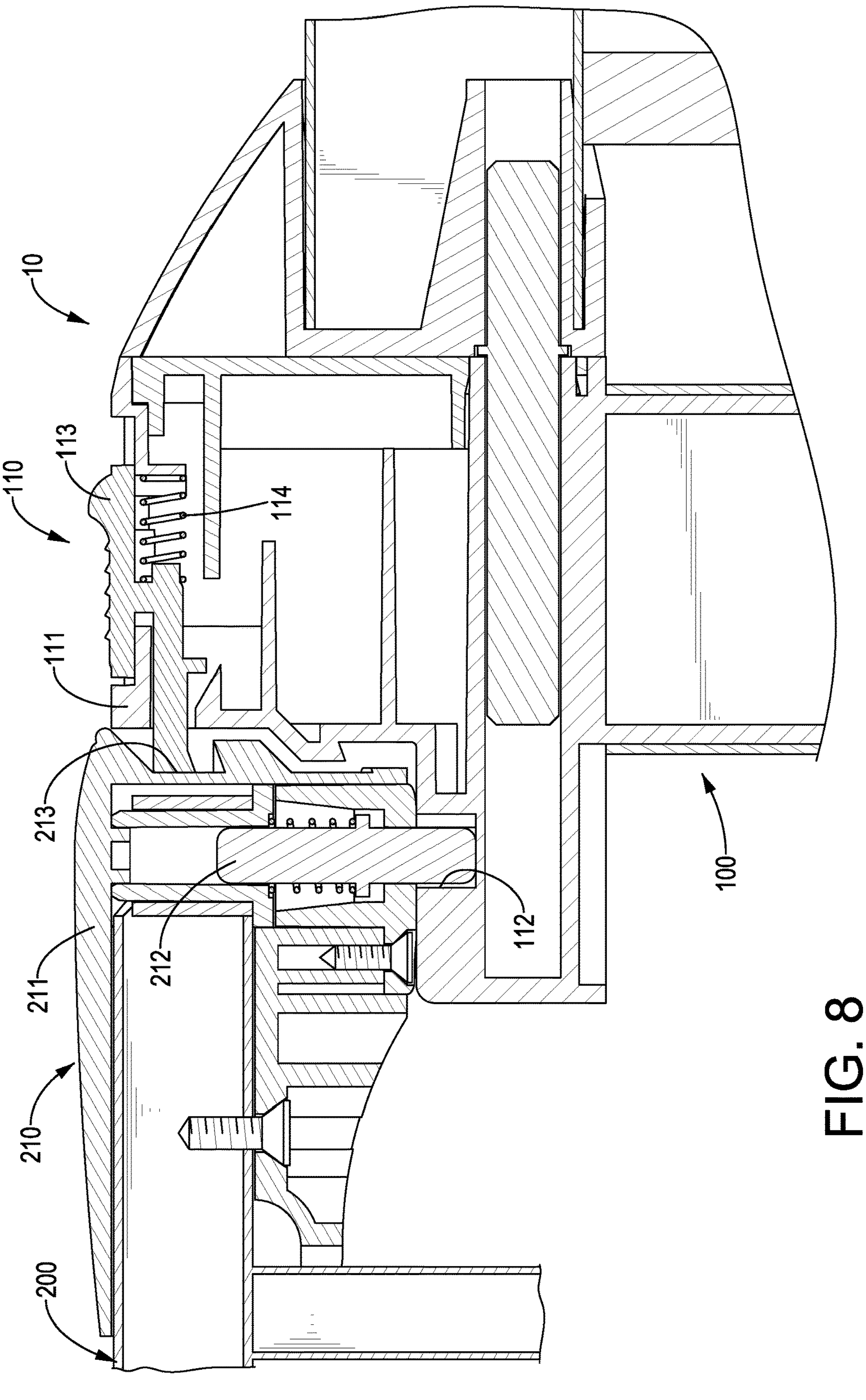
FIG. 8 is an operational enlarged front side view in partial section of the second embodiment of the safety gate in FIG. 2.

With reference to FIGS. 7 and 8, in some embodiments, each first positioning assembly 110 further has a resilient element 114 mounted in the first positioning base 111 of the first positioning assembly 110. The resilient element 114 includes, but is not limited to, a spring. In the first positioning assembly 110, the resilient element 114 is connected between the first positioning base 111 and the limiting member 113 of the first positioning assembly 110 and is located away from the other side of the frame 100. The resilient element 114 of each first positioning assembly 110 is configured to push the limiting member 113 to insert the end of the limiting member 113 to the limiting groove 213 of the first pivot assembly 210 at the side of the gate body 200.

The resilient element 114 of each first positioning assembly 110 makes the limiting member 113 of the first positioning assembly 110 automatically reset. The resilient element 114 of each first positioning assembly 110 makes the limiting member 113 of the first positioning assembly 110 extend into the limiting groove 213 on the first mounting base 211 of the first pivot assembly 210 at the respective side of the gate body 200, when the first retractable pin 212 of the first pivot assembly 210 is inserted in the first engaging hole 112 on the first positioning base 111 of the first positioning assembly 110.

Figure 6:
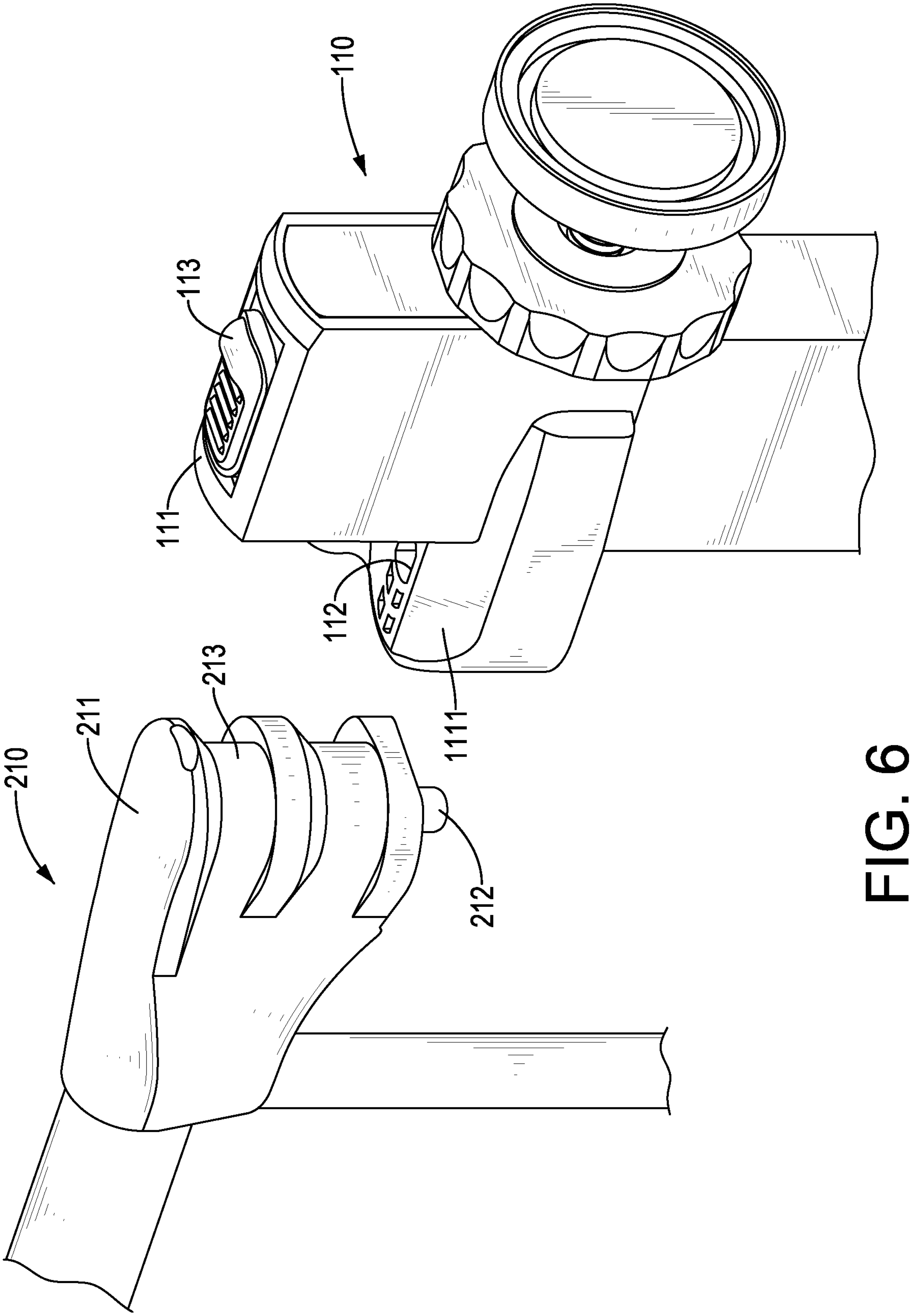
FIG. 6 is an enlarged exploded perspective view of the first embodiment of the safety gate in FIG. 1.

With reference to FIG. 6, in some embodiments, the first positioning base 111 of the first positioning assembly 110 has a first abutting slope 1111 formed on an edge of the first positioning base 111 and located at a side with respect to the first engaging hole 112 on the first positioning base 111. For example, when the gate body 200 is swung to move the first retractable pin 212 of the first pivot assembly 210 at one side of the gate body 200 toward the first engaging hole 112 of the first positioning assembly 110 disposed at the same side of the frame 100, the first retractable pin 212 is abutted by the first abutting slope 1111 on the first positioning base 111 and retracts into the first mounting base 211, then the first retractable pin 212 moves to the first engaging hole 112 and extends into the first engaging hole 112 by a resilience force. When the side of the gate body 200 separates from the frame 100 and the user would like to reconnect them and to close the safety gate 10, the first retractable pin 212 slides along and is abutted by the first abutting slope 1111 to retract into the first mounting base 211 till the first retractable pin 212 aligns with the first engaging hole 112 to extend into and engage with the first engaging hole 112 on the first positioning base 111.

Figure 5:
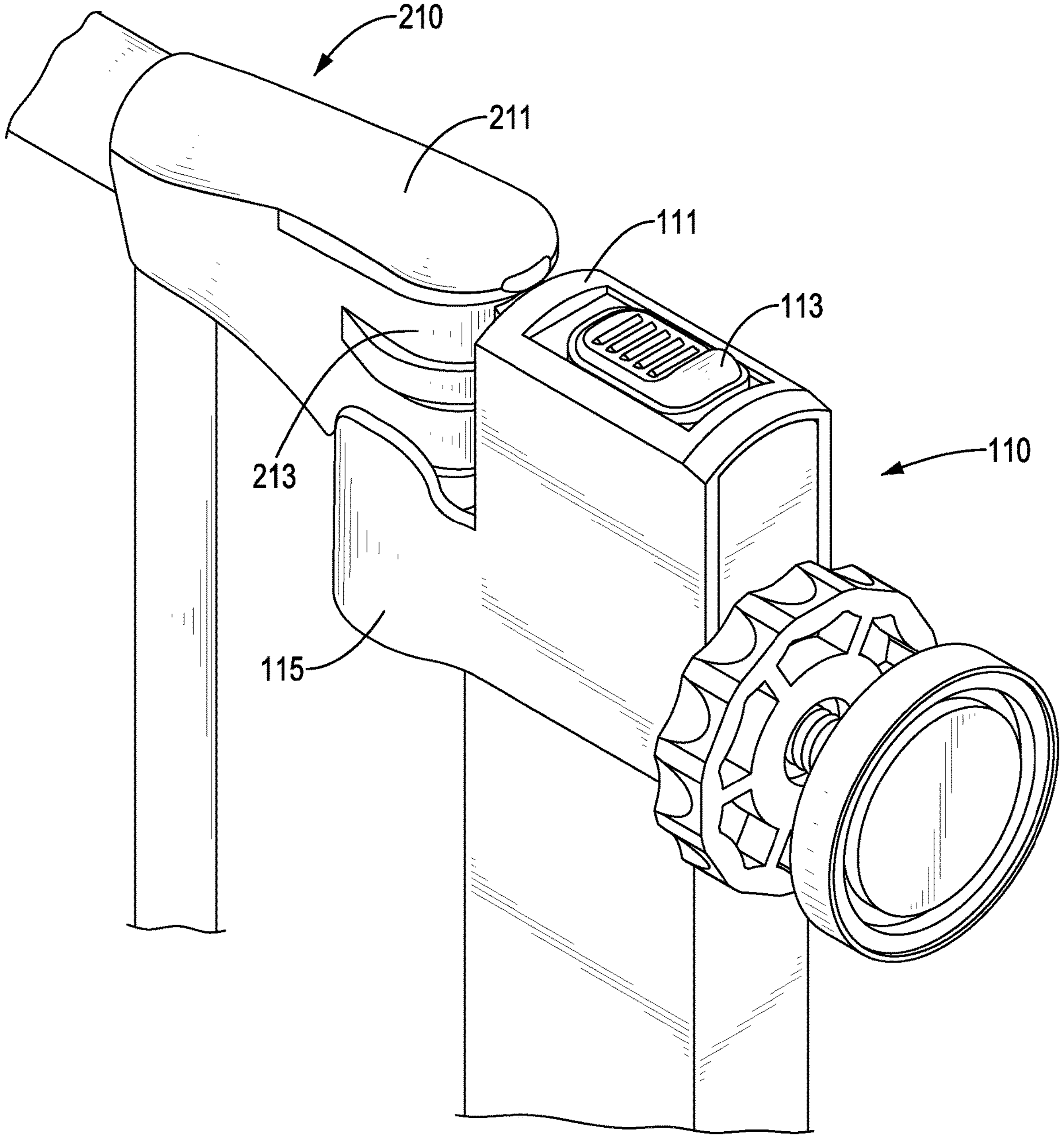
FIG. 5 is an enlarged perspective view of the first embodiment of the safety gate in FIG. 1.

With reference to FIG. 5, in some embodiments, each first positioning assembly 110 has a blocking piece 115 formed on the first positioning base 111 of the first positioning assembly 110, extending toward the other first positioning assembly 110, partially disposed in a swinging path of the gate body 200 for limiting the gate body 200, and blocking the gate body 200 to limit the swinging path of the gate body 200. The blocking piece 115 can block a movement of the gate body 200 and enhance the reliability of connecting position between the frame 100 and the gate body 200. When the safety gate 10 is closed, the blocking piece 115 limits relative positions of the gate body 200 and the frame 100 to prevent the safety gate 10 from being opened. In addition, when the safety gate 10 is opened, for example, one side of the gate body 200 is separated from the other side of the frame 100, the side of the gate body 200 can be swung to close the safety gate 10. The user may swing the gate body 200 too hard, and the blocking piece 115 can block the gate body 200 to stop the movement of the gate body 200 and to ensure the first retractable pin 212 of the first pivot assembly 210 disposed at the other side of the gate body 200 extends into the first engaging hole 112 in the first positioning base 111 of the first positioning assembly 110 disposed at the side of the frame 100.

In some embodiments, the blocking piece 115 may be integrally formed on the first positioning base 111 as a whole piece.

Figure 3:
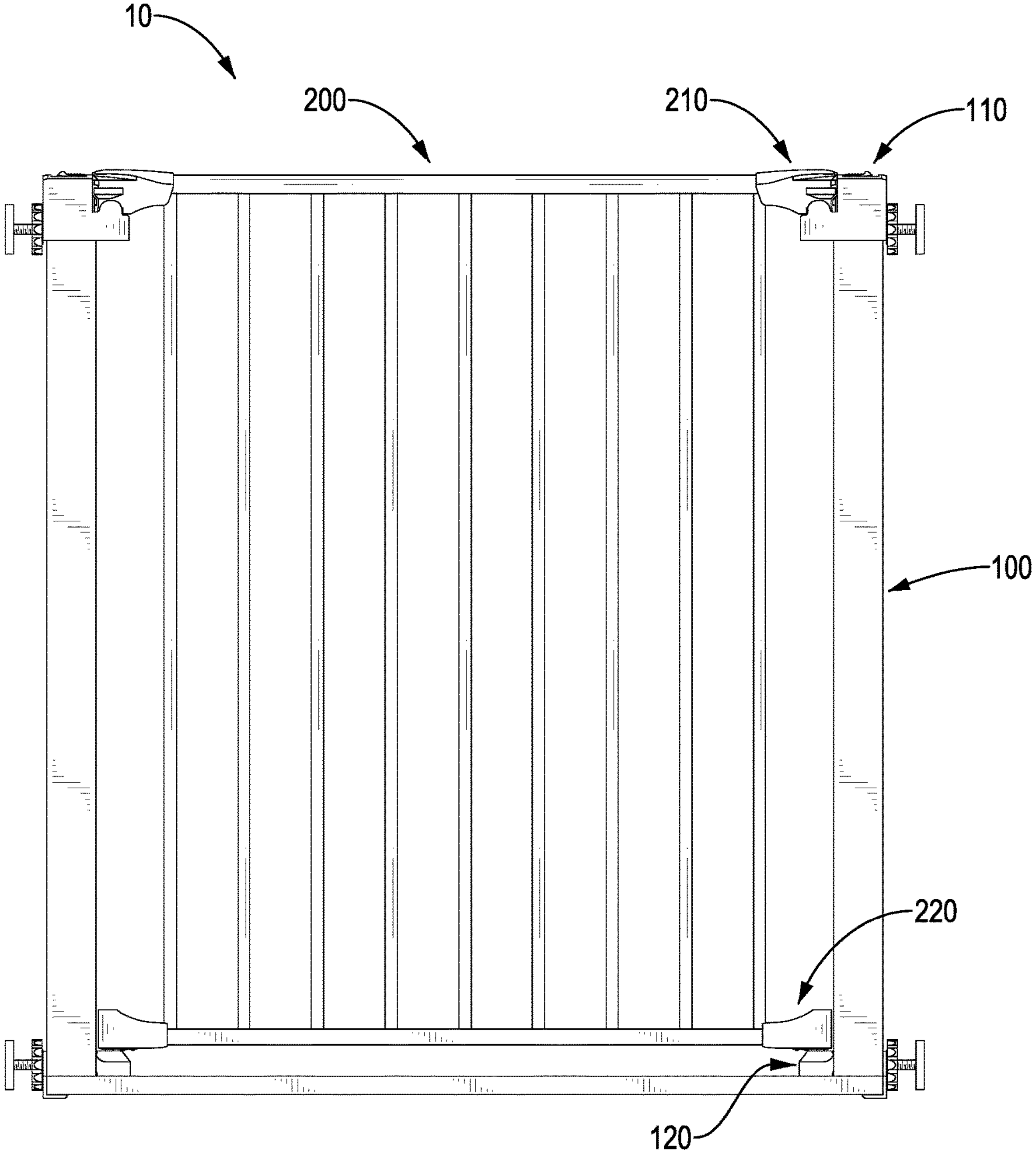
FIG. 3 is a front side view of the first embodiment of the safety gate in FIG. 1.
Figure 4:
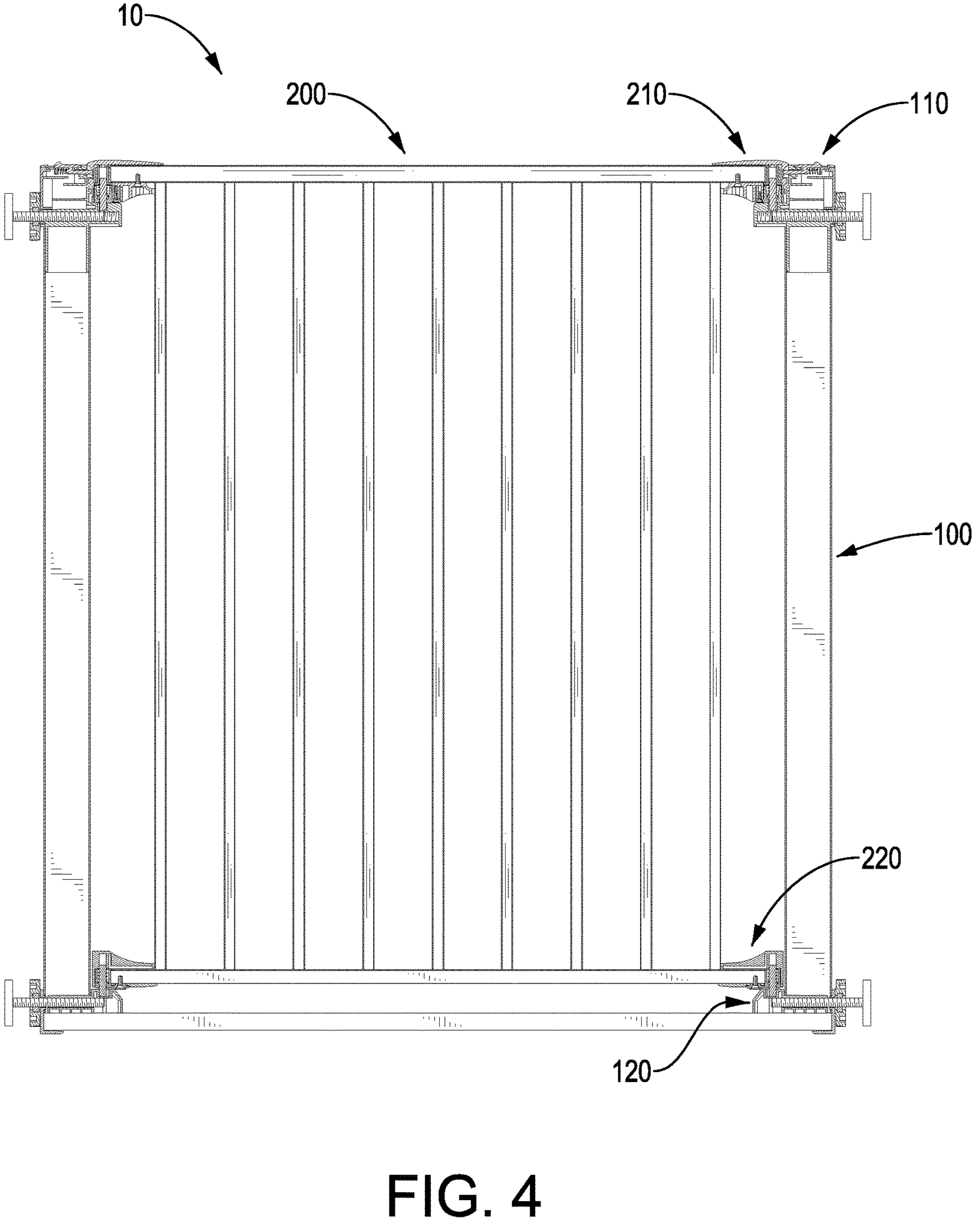
FIG. 4 is a front side view in partial section of the first embodiment of the safety gate in FIG. 3.
Figure 9:
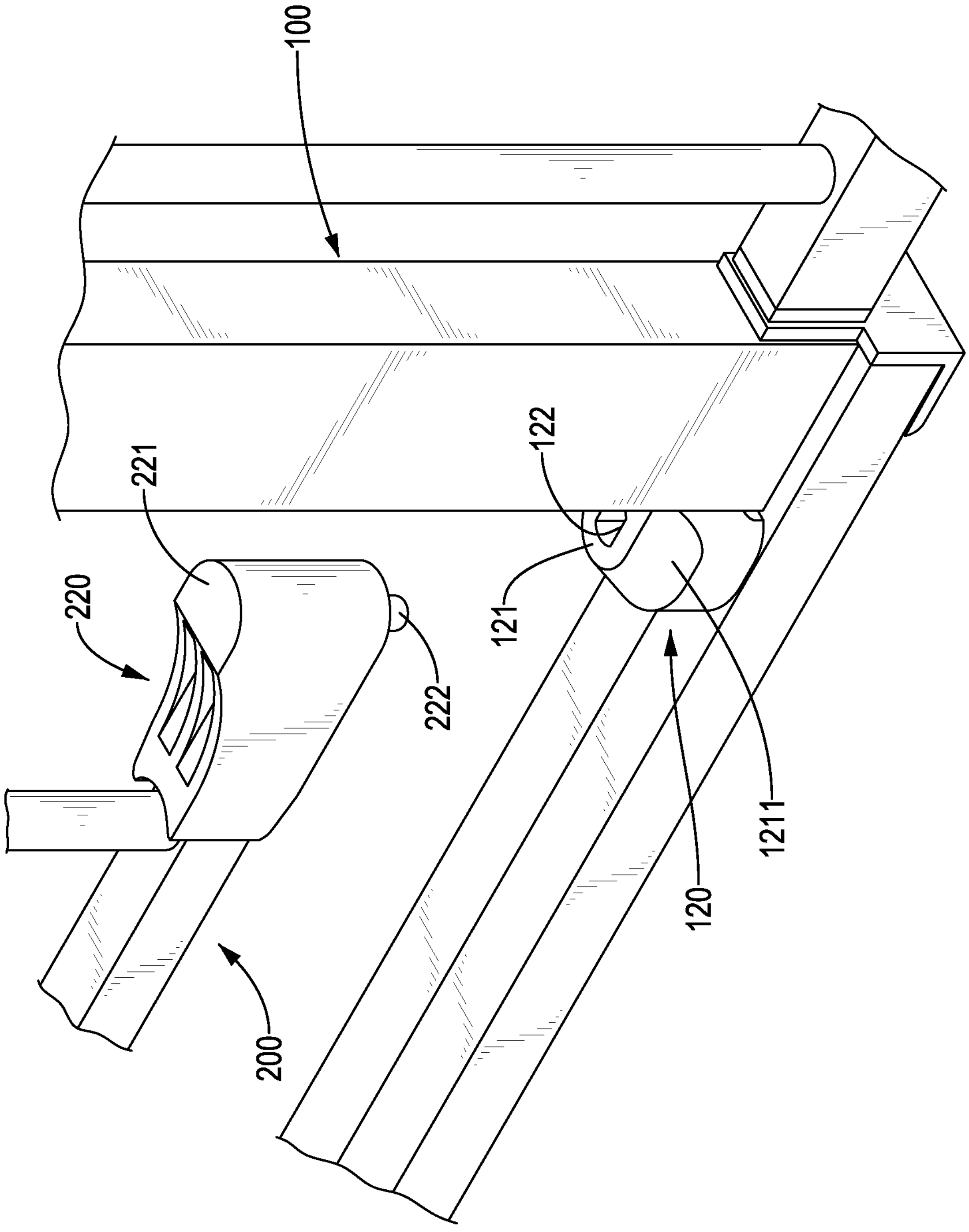
FIG. 9 is an enlarged exploded perspective view of the second embodiment of the safety gate in FIG. 2.
Figure 10:
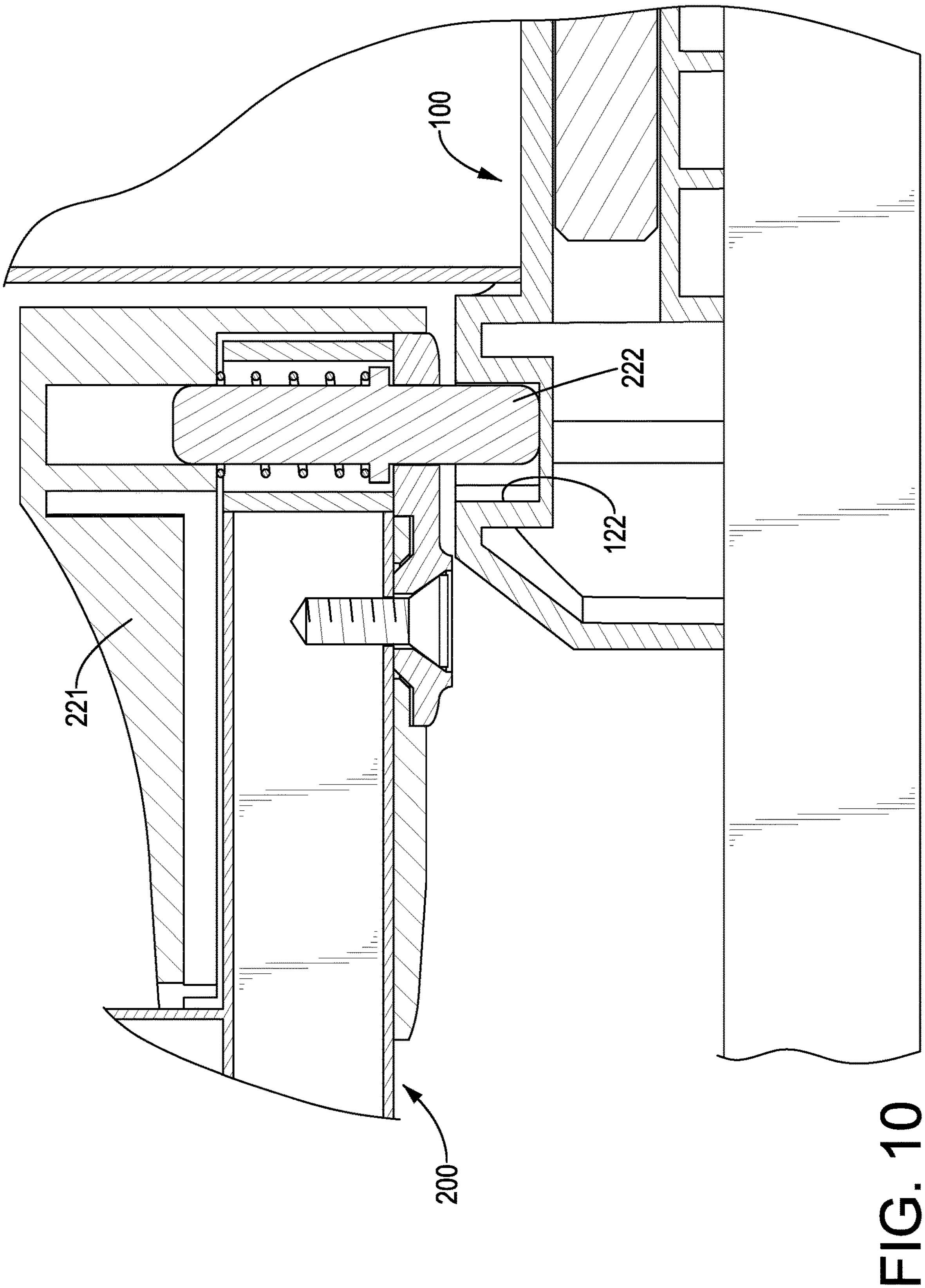
FIG. 10 is an enlarged cross sectional front side view of the second embodiment of the safety gate in FIG. 2.

With reference to FIGS. 3, 9, and 10, in some embodiments, the frame 100 has two second positioning assemblies 120. Each second positioning assembly 120 is disposed at a respective one of the two sides of the frame 100. The second positioning assembly 120 is spaced apart from and located below the first positioning assembly 110 at the same side of the frame 100. The gate body 200 has two second pivot assemblies 220. Each second pivot assembly 220 is disposed at a respective one of the sides of the gate body 200. The second pivot assembly 220 is spaced apart from and located below the first pivot assembly 210 at the same side of the gate body 200, and is configured to detachably and pivotally connect with the second positioning assembly 120 at the side of the frame 100. With the arrangement of the second positioning assemblies 120 and the second pivot assemblies 220, the stable connection between the gate body 200 and the frame 100 is promoted.

Specifically, in FIGS. 8 and 9, the second positioning assembly 120 has a second positioning base 121 and a second engaging hole 122 formed in the second positioning base 121; the second pivot assembly 220 has a second mounting base 221 and a second retractable pin 222, connected to the gate body 200 via the second mounting base 221, and configured to extend into the second engaging hole 122 of the second positioning assembly 120 at the side of the frame 100.

When any one of the two sides of the gate body 200 is pivotally connected to one of the sides of the frame 100, the first retractable pin 212 and the second retractable pin 222 disposed at the side of the gate body 200 respectively extend and engage with the first engaging hole 112 and the second engaging hole 122 disposed at the side of the frame 100.

When the gate body 200 is subjected to a force to remove the first retractable pin 212 disposed at either one of the two sides of the gate body 200 from the first engaging hole 112 at the respective one of the two sides of the frame 100, the second retractable pin 222 of the same side of the gate body 200 is removed from the second engaging hole 122 of the second positioning assembly 120 at the respective one side of the frame 100, too.

Furthermore, the second positioning base 121 of each second positioning assembly 120 has a second abutting slope 1211 formed on an edge of the second positioning base 121. When one of the two sides of the gate body 200 is subjected to a force and brings the second retractable pin 222 of the second pivot assembly 220 toward the second engaging hole 122 of the second positioning assembly 120 disposed at a respective one of the two sides of the frame 100, the second retractable pin 222 is abutted by the second abutting slope 1211 of the second positioning assembly 120, retracts into the second mounting base 221 of the second pivot assembly 220, and then the second retractable pin 222 moves to and engages with the second engaging hole 122.

Figure 2:
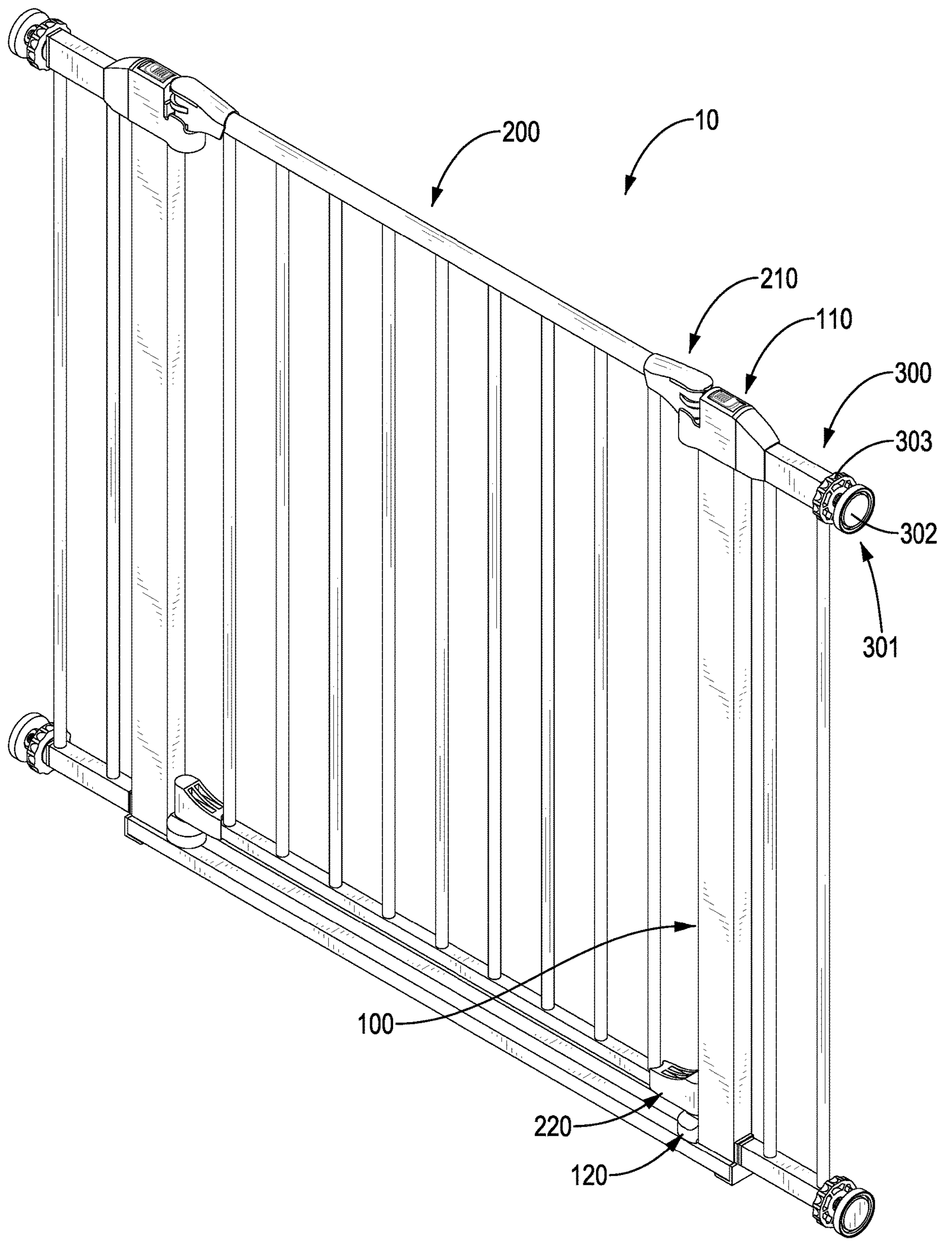
FIG. 2 is a perspective view of a second embodiment of a safety gate in accordance with the present invention.

With reference to FIG. 2, in some embodiments, the safety gate 10 comprises two extension units 300. Each of the two extension units 300 is mounted to a respective one of the two sides of the frame 100 and is located away from the gate body 200. An adjustable assembly 301 is mounted to each of the two extension units 300 and is located opposite to the frame 100. The adjustable assembly 301 has a fastener 302 and a knob 303. The fastener 302 includes, but is not limited to, a threaded rod. The fastener 302 is mounted through the knob 303, is connected with the knob 303 via a threaded connection, and partially extends into the extension unit 300. The knob 303 is configured to adjust a length of a portion of the fastener 302 that extends out from the extension unit 300. If a distance between the two walls is larger than the width of the frame 100, the user can further equip the two extension units 300 to the two sides of the frame 100 respectively. Respective distances and respective abutting forces between the two extension units 300 and the two walls can be adjusted via the adjustable assembly 301.

What is claimed is:

1. A safety gate configured to be mounted at a gateway and comprising:

a frame configured to be mounted between two walls respectively disposed at two opposite sides of the gateway and having two sides and two first positioning assemblies, each of the two first positioning assemblies disposed at a respective one of the two sides of the frame; and a gate body disposed in the frame and having two sides and two first pivot assemblies, each of the two first pivot assemblies disposed at a respective one of the two sides of the gate body for being detachably and pivotally connected to the first positioning assembly disposed at one of the two sides of the frame; wherein one of the two sides of the gate body is detachably connected to one of the two sides of the frame via a detachable connection of the first pivot assembly at said one side of the gate body and the first positioning assembly at said one side of the frame;

the other one of the two sides of the gate body is detachably connected to the other one of the two sides of the frame via a detachable connection of the first pivot assembly at the other one of the two sides of the gate body and the first positioning assembly at the other one of the two sides of the frame; and each of the two sides of the gate body is pivotally connected to a respective one of the two sides of the frame when the other one of the two sides of the gate body is disconnected from the other one of the two sides of the frame; wherein each first positioning assembly has a first positioning base; and a first engaging hole formed in the first positioning base;

each first pivot assembly has a first mounting base mounted to the gate body; and a first retractable pin retractably connected with the first mounting base and having an end selectively extending into the first engaging hole of the first positioning assembly disposed at the respective one of the two sides of the frame; wherein when one of the two sides of the gate body is pivotally connected to one of the two sides of the frame, the first retractable pin of the first pivot assembly disposed at said one side of the gate body extends into the first engaging hole of the first positioning assembly disposed at said one side of the frame, the first retractable pin of the first pivot assembly disposed at the other side of the gate body is able to be removed from the first engaging hole of the first positioning assembly disposed at the other side of the frame by the other side of the frame subjected to a force for separating the other side of the gate body and the other side of the frame.

2. The safety gate as claimed in claim 1, wherein each first pivot assembly has a limiting groove formed in the first mounting base at a side of the first mounting base away from the other side of the gate body;

each first positioning assembly has a limiting member for engaging with the limiting groove in the first mounting base of the first pivot assembly at a respective one of the two sides of the gate body to fix the first mounting base of the first pivot assembly at the respective side of the gate body;

the limiting member of each first positioning assembly is slidably mounted within the first positioning base of the first positioning assembly and has an end aligned with the limiting groove of the first mounting base of the first pivot assembly.

3. The safety gate as claimed in claim 2, wherein the first positioning base of the first positioning assembly at each of the two sides of the frame has a first abutting slope formed on an edge of the first positioning base;

when one of the two sides of the gate body is pivotally connected to one of the two sides of the frame and the gate body is swung to move the first retractable pin of the first pivot assembly disposed at the other side of the gate body toward the first engaging hole of the first positioning assembly disposed at the other side of the frame, the first retractable pin of the first pivot assembly disposed at the other side of the gate body is abutted by the first abutting slope of the first positioning base disposed at the other side of the frame and retracts into the first mounting base of the first pivot assembly disposed at the other side of the gate body, then the first retractable pin of the first pivot assembly disposed at the other side of the gate body moves to the first engaging hole and extends into the first engaging hole of the first positioning base disposed at the other side of the frame by a resilience force.

4. The safety gate as claimed in claim 2, wherein the frame has two second positioning assemblies, and each of the two second positioning assemblies is disposed at a respective one of the two sides of the frame; and the gate body has two second pivot assemblies, and each of the two second pivot assemblies is disposed at a respective one of the two sides of the gate body, and is configured to be detachably and pivotally connected to the second positioning assembly disposed at a respective one of the two sides of the frame.

5. The safety gate as claimed in claim 4, wherein the second positioning assembly at each of the two sides of the frame has
- a second positioning base; and
- a second engaging hole formed in the second positioning base;

the second pivot assembly at each of the two sides of the gate body has
- a second mounting base mounted to the gate body; and
- a second retractable pin retractably connected with the second mounting base and having an end selectively extending into the second engaging hole of the second positioning assembly at the respective one of the two sides of the frame; wherein when one of the two sides of the gate body is pivotally connected to one of the two sides of the frame, the second retractable pin of the second pivot assembly disposed at said one side of the gate body extends into the second engaging hole of the second positioning assembly disposed at said one side of the frame;

when the gate body is subjected to a force to remove the first retractable pin of the first pivot assembly disposed at one of the two sides of the gate body from the first engaging hole of the first positioning assembly at the respective one of the two sides of the frame, the second retractable pin of the second pivot assembly disposed at said one side of the gate body is removed from the second engaging hole of the second positioning assembly disposed at the respective one of the two sides of the frame.

6. The safety gate as claimed in claim 5, wherein the second positioning base of the second positioning assembly at each of the two sides of the frame has a second abutting slope formed on an edge of the second positioning base;

when the gate body is swung to move the second retractable pin of the second pivot assembly disposed at one of the two sides of the gate body toward the second engaging hole of the second positioning assembly disposed at the respective one of the two sides of the frame, the second retractable pin is abutted by the second abutting slope of the second positioning base disposed at the respective one of the two sides of the frame and retracts into the second mounting base of the second pivot assembly at said one side of the frame, then the second retractable pin moves to the second engaging hole and extends into the second engaging hole of the second positioning assembly disposed at the respective one of the two sides of the frame by a resilience force.

7. The safety gate as claimed in claim 2, wherein each first positioning assembly has a resilient element located at a side of the limiting member away from the other one of the two sides of the frame, connected between the limiting member and the first positioning base of the first positioning assembly for pushing the limiting member of the first positioning assembly to engage with the limiting groove of the first pivot assembly disposed at the respective one of the two sides of the gate body via the end of the limiting member.

8. The safety gate as claimed in claim 7, wherein the first positioning base of the first positioning assembly at each of the two sides of the frame has a first abutting slope formed on an edge of the first positioning base;

when one of the two sides of the gate body is pivotally connected to one of the two sides of the frame and the gate body is swung to move the first retractable pin of the first pivot assembly disposed at the other side of the gate body toward the first engaging hole of the first positioning assembly disposed at the other side of the frame, the first retractable pin of the first pivot assembly disposed at the other side of the gate body is abutted by the first abutting slope of the first positioning base disposed at the other side of the frame and retracts into the first mounting base of the first pivot assembly disposed at the other side of the gate body, then the first retractable pin of the first pivot assembly disposed at the other side of the gate body moves to the first engaging hole and extends into the first engaging hole of the first positioning base disposed at the other side of the frame by a resilience force.

9. The safety gate as claimed in claim 7, wherein
the frame has two second positioning assemblies, and each of the two second positioning assemblies is disposed at a respective one of the two sides of the frame; and
the gate body has two second pivot assemblies, and each of the two second pivot assemblies is disposed at a respective one of the two sides of the gate body, and is configured to be detachably and pivotally connected to the second positioning assembly disposed at a respective one of the two sides of the frame.

10. The safety gate as claimed in claim 9, wherein
each second positioning assembly has
a second positioning base; and
a second engaging hole formed in the second positioning base;
each second pivot assembly has
a second mounting base mounted to the gate body; and
a second retractable pin retractably connected with the second mounting base and having an end selectively extending into the second engaging hole of the second positioning assembly at the respective one of the two sides of the frame; wherein
when one of the two sides of the gate body is pivotally connected to one of the two sides of the frame, the second retractable pin of the second pivot assembly disposed at said one side of the gate body extends into the second engaging hole of the second positioning assembly disposed at said one side of the frame;
when the gate body is subjected to a force to remove the first retractable pin of the first pivot assembly disposed at one of the two sides of the gate body from the first engaging hole of the first positioning assembly at the respective one of the two sides of the frame, the second retractable pin of the second pivot assembly disposed at said one side of the gate body is removed from the second engaging hole of the second positioning assembly disposed at the respective one of the two sides of the frame.

11. The safety gate as claimed in claim 10, wherein
the second positioning base of the second positioning assembly at each of the two sides of the frame has a second abutting slope formed on an edge of the second positioning base;
when the gate body is swung to move the second retractable pin of the second pivot assembly disposed at one of the two sides of the gate body toward the second engaging hole of the second positioning assembly disposed at the respective one of the two sides of the frame, the second retractable pin is abutted by the second abutting slope of the second positioning base disposed at the respective one of the two sides of the frame and retracts into the second mounting base of the second pivot assembly at said one side of the frame, then the second retractable pin moves to the second engaging hole and extends into the second engaging hole of the second positioning assembly disposed at the respective one of the two sides of the frame by a resilience force.

12. The safety gate as claimed in claim 1, wherein
the first positioning base of the first positioning assembly at each of the two sides of the frame has a first abutting slope formed on an edge of the first positioning base;
when one of the two sides of the gate body is pivotally connected to one of the two sides of the frame and the gate body is swung to move the first retractable pin of the first pivot assembly disposed at the other side of the gate body toward the first engaging hole of the first positioning assembly disposed at the other side of the frame, the first retractable pin of the first pivot assembly disposed at the other side of the gate body is abutted by the first abutting slope of the first positioning base disposed at the other side of the frame and retracts into the first mounting base of the first pivot assembly disposed at the other side of the gate body, then the first retractable pin of the first pivot assembly disposed at the other side of the gate body moves to the first engaging hole and extends into the first engaging hole of the first positioning base disposed at the other side of the frame by a resilience force.

13. The safety gate as claimed in claim 1, wherein
the frame has two second positioning assemblies, and each of the two second positioning assemblies is disposed at a respective one of the two sides of the frame; and
the gate body has two second pivot assemblies, and each of the two second pivot assemblies is disposed at a respective one of the two sides of the gate body, and is configured to be detachably and pivotally connected to the second positioning assembly disposed at a respective one of the two sides of the frame.

14. The safety gate as claimed in claim 13, wherein
each second positioning assembly has
a second positioning base; and
a second engaging hole formed in the second positioning base;
each second pivot assembly has
a second mounting base mounted to the gate body; and
a second retractable pin retractably connected with the second mounting base and having an end selectively extending into the second engaging hole of the second positioning assembly at the respective one of the two sides of the frame; wherein
when one of the two sides of the gate body is pivotally connected to one of the two sides of the frame, the second retractable pin of the second pivot assembly disposed at said one side of the gate body extends into the second engaging hole of the second positioning assembly disposed at said one side of the frame;
when the gate body is subjected to a force to remove the first retractable pin of the first pivot assembly disposed at one of the two sides of the gate body from the first engaging hole of the first positioning assembly at the respective one of the two sides of the frame, the second retractable pin of the second pivot assembly disposed at said one side of the gate body is removed from the second engaging hole of the second positioning assembly disposed at the respective one of the two sides of the frame.

15. The safety gate as claimed in claim 14, wherein
the second positioning base of the second positioning assembly at each of the two sides of the frame has a second abutting slope formed on an edge of the second positioning base;
when the gate body is swung to move the second retractable pin of the second pivot assembly disposed at one of the two sides of the gate body toward the second engaging hole of the second positioning assembly disposed at the respective one of the two sides of the frame, the second retractable pin is abutted by the second abutting slope of the second positioning base disposed at the respective one of the two sides of the frame and retracts into the second mounting base of the second pivot assembly at said one side of the frame, then the second retractable pin moves to the second engaging hole and extends into the second engaging hole of the second positioning assembly disposed at the respective one of the two sides of the frame by a resilience force.

16. A safety gate configured to be mounted at a gateway and comprising:

a frame configured to be mounted between two walls respectively disposed at two opposite sides of the gateway and having two sides and two first positioning assemblies, each of the two first positioning assemblies disposed at a respective one of the two sides of the frame; and a gate body disposed in the frame and having two sides and two first pivot assemblies, each of the two first pivot assemblies disposed at a respective one of the two sides of the gate body for being detachably and pivotally connected to the first positioning assembly disposed at one of the two sides of the frame; wherein one of the two sides of the gate body is detachably connected to one of the two sides of the frame via a detachable connection of the first pivot assembly at said one side of the gate body and the first positioning assembly at said one side of the frame;

the other one of the two sides of the gate body is detachably connected to the other one of the two sides of the frame via a detachable connection of the first pivot assembly at the other one of the two sides of the gate body and the first positioning assembly at the other one of the two sides of the frame; and each of the two sides of the gate body is pivotally connected to a respective one of the two sides of the frame when the other one of the two sides of the gate body is disconnected from the other one of the two sides of the frame, wherein the frame has two second positioning assemblies, and each of the two second positioning assemblies is disposed at a respective one of the two sides of the frame; and the gate body has two second pivot assemblies, and each of the two second pivot assemblies is disposed at a respective one of the two sides of the gate body, and is configured to be detachably and pivotally connected to the second positioning assembly disposed at a respective one of the two sides of the frame, wherein each second positioning assembly has
  a second positioning base; and
  a second engaging hole formed in the second positioning base;

each second pivot assembly has
  a second mounting base mounted to the gate body; and
  a second retractable pin retractably connected with the second mounting base and having an end selectively extending into the second engaging hole of the second positioning assembly at the respective one of the two sides of the frame; wherein when one of the two sides of the gate body is pivotally connected to one of the two sides of the frame, the second retractable pin of the second pivot assembly disposed at said one side of the gate body extends into the second engaging hole of the second positioning assembly disposed at said one side of the frame;

when the gate body is subjected to a force to remove the first retractable pin of the first pivot assembly disposed at one of the two sides of the gate body from the first engaging hole of the first positioning assembly at the respective one of the two sides of the frame, the second retractable pin of the second pivot assembly disposed at said one side of the gate body is removed from the second engaging hole of the second positioning assembly disposed at the respective one of the two sides of the frame.

17. The safety gate as claimed in claim 16, wherein the second positioning base of the second positioning assembly at each of the two sides of the frame has a second abutting slope formed on an edge of the second positioning base;

when the gate body is swung to move the second retractable pin of the second pivot assembly disposed at one of the two sides of the gate body toward the second engaging hole of the second positioning assembly disposed at the respective one of the two sides of the frame, the second retractable pin is abutted by the second abutting slope of the second positioning base disposed at the respective one of the two sides of the frame and retracts into the second mounting base of the second pivot assembly at said one side of the frame, then the second retractable pin moves to the second engaging hole and extends into the second engaging hole of the second positioning assembly disposed at the respective one of the two sides of the frame by a resilience force.

* * * * *